Patented June 8, 1948

2,443,016

UNITED STATES PATENT OFFICE 2,443,016

CATALYTIC PROCESS

Gerald M. Whitman, Claymont, Del., assignor to E. I. du Pont de Nemours & Company, Wilmington, Del., a corporation of Delaware No Drawing. Application March 25, 1946, Serial No. 657,069

5 Claims. (Cl. 260—667)

This invention relates to hydrogenation processes and more particularly to a catalytic process for hydrogenation of mononuclear aromatic hydrocarbons.

Heretofore aromatic hydrocarbons have been hydrogenated to the corresponding cycloaliphatic compounds using such hydrogenation catalysts as nickel, cobalt, and platinum. Benzene, for example, is rapidly hydrogenated over nickel at about 150° C. under 100 atmospheres pressure. Toluene and other alkylated benzenes require temperatures of about 125° to 175° C. With nickel, cobalt, and similar catalysts it is necessary to purify the benzene so as to free it of thiophene and other sulfur compounds normally present in small amounts, and which act as poisons for these catalysts. Otherwise the catalyst becomes poisoned and the reaction stops.

It is an object of this invention to provide a method for the production of cyclohexanes from benzene and alkylated benzenes. A further object is to provide a process for the ring hydrogenation of benzene and alkylated benzenes in the presence of organic sulfur compounds. Another object is to provide an effective catalyst for the ring hydrogenation of benzene and of alkylated benzenes in the presence of the small amounts of organic sulfur compounds normally present as impurities. Other objects will appear hereinafter.

These objects are accomplished by the following invention which comprises reacting hydrogen with a member of the group consisting of benzene and alkylated benzenes under pressure at a temperature in excess of 50° C. in the presence of a catalytic amount of metallic sodium. I have discovered that metallic sodium is an effective catalyst for the ring hydrogenation of mononuclear aromatic hydrocarbons (benzene and alkylated benzenes) in the presence of organic sulfur compounds.

In carrying out the process of the present invention, it is necessary to operate under superatmospheric pressures. The operational requirements therefore comprise means for compressing the reactants, pressure resistant reaction vessels, heating and agitating means, connecting lines, gauges, controlling valves and the like. Preferably, there are also provided means for maintaining the pressure within the reactor as the reaction proceeds. The following detailed description illustrates one manner of carrying out the batchwise operation of the process.

A pressure-resistant vessel is charged with the benzene or alkylated benzene and metallic sodium. This charging operation is preferably carried out after purging the reaction vessel free of oxygen and moisture with deoxygenated nitrogen or other inert gas. The vessel is then closed, placed in a shaker machine provided with a heater, and connected to a reservoir of hydrogen. Controlling and recording thermocouples are placed in position, the vessel pressured with hydrogen, and heating and agitation are started. On reaching the selected reaction temperature, the reaction begins. Throughout the reaction period the pressure is maintained within the desired range by periodically repressuring with hydrogen. After reaction is complete, as evidenced by cessation of pressure drop, the reaction vessel is allowed to cool, opened and the contents discharged and filtered. The reaction products are isolated by means known to those skilled in the art.

The process may be carried out in a continuous manner by continuously or intermittently passing the benzene and hydrogen into a reaction zone, subjecting the benzee and hydrogen in said reaction zone to the reaction temperature and pressure in the presence of a catalytic amount of metallic sodium, thereby effecting hydrogenation of said benzene, and continuously or intermittently withdrawing reaction products containing the corresponding cycloaliphatic hydrocarbon.

This invention is further illustrated by the following example in which parts are by weight unless otherwise specified.

Example 1

A mixture of 125 parts of benzene and 6.3 parts of metallic sodium is placed in a pressure vessel and heated with vigorous agitation to 200° C. under 150 atmospheres pressure of hydrogen. In the course of five hours about one mole of hydrogen per mole of benzene is absorbed. The shaking is stopped, the pressure vessel cooled and the product is discharged. The filtered product distils completely at 78° to 80° C. Refractive index values on successive fractions as well as carbon-hydrogen analyses indicate the presence of 27% cyclohexane and 73% benzene in the product. The absence of cyclohexene and cyclohexadiene is shown by a negative iodine number and by failure of the product to absorb bromine.

The present invention affords an effective method for the ring hydrogenation of mononuclear aromatic hydrocarbons to the corresponding cycloaliphatic hydrocarbons. The hydrogenation of benzene and of all alkylated benzenes to the corresponding cycloaliphatic compounds is included within the scope of this invention. Examples of suitable benzenes are benzene, toluene, xylene, ethyl benzene, propyl benzene, isoamyl benzene, 1-methyl-3-butyl benzene, cumene, mesitylene, cymene, and the like.

Although in the example there have been indicated certain definite temperature and pressure conditions, duration of reaction, catalyst concentration and the like, it is to be understood that these values may be varied wtihin the scope of this invention since the conditions of any one example are determined to some extent by the particular benzene being treated. These values should also be chosen so as to favor the desired ring hydrogenation reaction rather than that of sodium hydride formation, which is competitive and utilizes the sodium catalyst. As a rule it is desirable to employ such temperature and pressure conditions and catalyst concentration as will give the desired product in maximum yield at a practical rate of reaction.

Reaction will sometimes occur at temperatures as low as 50° C. but it is preferred to operate above 100° C. and better still above 150° C. in order to obtain satisfactory yields of the desired product in a reasonable reaction time. The use of temperatures above 400° C. is not desirable or necessary.

The process can be operated under hydrogen pressures of 100 lb./sq. in. Usually, however, pressures above 1000 lb./sq. in. are employed since better conversions are thereby obtained. Although pressures up to the practical limit of the equipment employed can be used, 15,000 lb./sq. in. represents a practical operating upper limit.

The amount of metallic sodium may range from 0.1 to 20%, but usually it is between 2 and 10% on the weight of the benzene treated.

Through the use of metallic sodium as a catalyst benzenes and alkylated benzenes can be converted to the corresponding cycloaliphatic compounds even in the presence of organic sulfur compounds such as thiophene. The use of metallic sodium for this reaction therefore has marked advantages over conventional hydrogenation catalysts in that it makes unnecessary purification of the benzenes to remove the small amounts of sulfur compounds normally present as impurities. Its use for this purpose therefore represents a practical solution to this technically important problem and operates to reduce costs significantly.

As many apparently widely different embodiments of this invention may be made without departing from the spirit and scope thereof, it is to be understood that I do not limit myself to the specific embodiments thereof except as defined in the appended claims.

I claim:

1. A process for the catalytic ring hydrogenation of a mononuclear aromatic hydrocarbon to the corresponding saturated cycloaliphatic hydrocarbon which comprises bringing hydrogen into contact with a member of the group consisting of benzene and alkylated benzenes in the presence of a catalytic amount of metallic sodium at a temperature in excess of 50° C. under a pressure of said hydrogen of at least 100 pounds per square inch, and separating therefrom the corresponding saturated cycloaliphatic hydrocarbon.

2. A process for the catalytic ring hydrogenation of a mononuclear aromatic hydrocarbon to the corresponding saturated cycloaliphatic hydrocarbon which comprises bringing hydrogen into contact with a member of the group consisting of benzene and alkylated benzenes in the presence of 0.1 to 20% of metallic sodium by weight of said mononuclear aromatic hydrocarbon at a temperature between 100° and 400° C., under a pressure of said hydrogen between 100 and 15,000 pounds per square inch, and separating therefrom the corresponding saturated cycloaliphatic hydrocarbon.

3. A process for the catalytic ring hydrogenation of a mononuclear aromatic hydrocarbon to the corresponding saturated cycloaliphatic hydrocarbon which comprises bringing hydrogen into contact with a member of the group consisting of benzene and alkylated benzenes in the presence of 2% to 10% of metallic sodium by weight of said mononuclear aromatic hydrocarbon at a temperature between 150° and 400° C., under a pressure of said hydrogen between 1000 and 15,000 pounds per square inch, and separating therefrom the corresponding saturated cycloaliphatic hydrocarbon.

4. A process for the catalytic ring hydrogenation of benzene to cyclohexane which comprises bringing hydrogen into contact with benzene, subjecting the mixture consisting of said hydrogen and benzene in the presence of a catalytic amount of metallic sodium to a temperature in excess of 50° C., under a pressure of said hydrogen of at least 100 pounds per square inch, and separating therefrom cyclohexane resulting from hydrogenation of said benzene.

5. A process for the catalytic ring hydrogenation of benzene to cyclohexane which comprises bringing hydrogen into contact with benzene, subjecting the mixture consisting of said hydrogen and benzene in the presence of 0.1 to 20% of metallic sodium by weight of said benzene to a temperature between 150 and 400° C., under a pressure of said hydrogen of 1000 to 15,000 pounds per square inch, and separating therefrom cyclohexane resulting from hydrogenation of said benzene.

GERALD M. WHITMAN.

REFERENCES CITED

The following references are of record in the file of this patent:

UNITED STATES PATENTS

| Number | Name | Date |
| --- | --- | --- |
| 1,729,943 | Hofsass | Oct. 1, 1929 |
| 1,965,956 | Dunkel et al. | July 10, 1934 |
| 2,021,567 | Muckenfuss | Nov. 19, 1935 |
| 2,182,242 | Wooster | Dec. 5, 1939 |